(12) United States Patent
Varanasi et al.

(10) Patent No.: US 11,356,448 B1
(45) Date of Patent: Jun. 7, 2022

(54) DEVICE AND METHOD FOR TRACKING UNIQUE DEVICE AND USER NETWORK ACCESS ACROSS MULTIPLE SECURITY APPLIANCES

(71) Applicant: Pulse Secure, LLC, San Jose, CA (US)

(72) Inventors: Kanti Varanasi, Sunnyvale, CA (US); Robin Singh, San Jose, CA (US); Naji Abdulla, San Jose, CA (US)

(73) Assignee: Pulse Secure, LLC, San Jose, CA (US)

( * ) Notice: Subject to any disclaimer, the term of this patent is extended or adjusted under 35 U.S.C. 154(b) by 358 days.

(21) Appl. No.: 16/382,068

(22) Filed: Apr. 11, 2019

Related U.S. Application Data

(60) Provisional application No. 62/657,322, filed on Apr. 13, 2018.

(51) Int. Cl.
*H04L 9/40* (2022.01)
*H04L 12/46* (2006.01)

(52) U.S. Cl.
CPC .......... *H04L 63/101* (2013.01); *H04L 63/083* (2013.01); *H04L 63/102* (2013.01); *H04L 12/4641* (2013.01); *H04L 63/20* (2013.01)

(58) Field of Classification Search
CPC ... H04L 63/101; H04L 63/102; H04L 63/083; H04L 12/4641; H04L 63/20
See application file for complete search history.

(56) References Cited

U.S. PATENT DOCUMENTS

| | | | |
|---|---|---|---|
| 5,990,810 A | 11/1999 | Williams | |
| 6,470,329 B1 | 10/2002 | Livschitz | |
| 7,080,077 B2 | 7/2006 | Ramamurthy et al. | |
| 7,133,914 B1* | 11/2006 | Holbrook | H04L 41/0813 709/224 |
| 7,600,125 B1 | 10/2009 | Stringham | |
| 7,734,826 B2 | 6/2010 | Brown et al. | |
| 8,260,742 B2 | 9/2012 | Cognigni et al. | |
| 8,768,895 B2 | 7/2014 | Patterson et al. | |
| 8,825,971 B1* | 9/2014 | Auchmoody | G06F 3/067 711/162 |
| 8,826,390 B1* | 9/2014 | Varda | G06F 21/6218 726/4 |
| 9,432,294 B1* | 8/2016 | Sharma | H04L 45/7457 |
| 9,444,744 B1* | 9/2016 | Sharma | H04L 63/101 |
| 2003/0005306 A1 | 1/2003 | Hunt et al. | |
| 2005/0004954 A1 | 1/2005 | Soule | |

(Continued)

*Primary Examiner* — Michael R Vaughan

(57) ABSTRACT

A private network includes a plurality of network security appliances participating in authenticating end users. Each network security appliance maintains a locally stored user list. A first network security appliance receives at least a portion of a non-local user list comprising second user identifier records for a second network security appliance of the plurality of network security appliances. The first network security appliance compares the local user list with the non-local user list received from the second network security appliance to identify one or more deviations. The first network security appliance merges the portion of the second user identifier records of the non-local user list corresponding with the one or more deviations with the first user identifier records of the local user list to generate an updated local user list. The first network security appliance authenticates a request to access the network using the updated local user list.

19 Claims, 8 Drawing Sheets

(56) References Cited

U.S. PATENT DOCUMENTS

| | | | |
|---|---|---|---|
| 2005/0278529 A1* | 12/2005 | Kano | H04L 63/08 |
| | | | 713/168 |
| 2011/0055179 A1* | 3/2011 | Arena | H04L 9/3239 |
| | | | 707/698 |
| 2015/0012497 A1* | 1/2015 | Clark | G06F 16/122 |
| | | | 707/654 |
| 2015/0249709 A1* | 9/2015 | Teng | H04L 67/42 |
| | | | 707/785 |
| 2016/0072814 A1* | 3/2016 | Martinelli | H04L 63/101 |
| | | | 726/1 |
| 2017/0310605 A1* | 10/2017 | Garcia | H04L 47/76 |

* cited by examiner

DEVICE AND METHOD FOR TRACKING UNIQUE DEVICE AND USER NETWORK ACCESS ACROSS MULTIPLE SECURITY APPLIANCES

This application claims the benefit of U.S. Provisional Application No. 62/657,322, filed Apr. 13, 2018, the entire contents of which are hereby incorporated by reference.

1 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © Pulse Secure LLC.

2 TECHNICAL FIELD

The exemplary, illustrative, technology herein relates to large scale network systems, and methods for tracking authentication events across a plurality of network appliances that participate in network access control and tracking network users and other details of connection activity.

3 BACKGROUND 3.1

Network appliances use several methods for counting and identifying authenticated end user devices and associated end users and of tracking access to network services by each end user or device, such as for license enforcement or usage billing. Network appliances, e.g. network access points, can be deployed in physical or logical groups as required to provide secure remote access to network services and resources. Multiple network appliances can be clustered for providing scalability and high availability.

Network appliances use several methods for tracking devices and users that utilize remote access to services. One such method is for each user appliance to maintaining a user list with a record established for each unique device and end user combination. However, since commutation sessions can migrate from one access point to another, there is a need for each network appliance to have access to all authenticated users in case a commutation session or portion of a communication session migrates from one access point to another. Thus, it is known for network appliances to periodically share user lists across all network appliances or network appliances to periodically add new users to the local user list based on updates from other network appliances. Accordingly, the size of the user list for a large public network service can be hundreds of thousands of individual users, with each username record having a plurality of data fields, some of which are being updated during the communication session.

In some cases, network appliances can be disconnected from one another due to network or hardware faults, network traffic bottle necks, or the like. In these situations, one or more network appliances are periodically isolated from other network appliances. While the partitioned network appliances still may be capable of handling new connections from end user devices and users, and of updating their own user lists, partitioned network appliances may not participate in a synchronization with the master list over several synchronization periods.

4 SUMMARY

In general, the techniques described herein include systems and methods for maintaining a distributed user list for a private network. A first network security appliance maintains a local user list that is distributed, and may be hashed prior to distribution, amongst a number of network security appliances for the network. When updates are received from another network security appliance, the first network security appliance may realize one or more deviations in the list maintained by the other network security device and update the local list accordingly, re-distributing the list as needed. The first network security appliance may also recognize non-relevant deviations, such as deviations that would not actually alter the user information in the list, and refrain from merging the non-relevant deviations into the user list. By utilizing the techniques described herein, rather than assembling and distributing a master list at a central processor, each of the network security appliances may be tasked with handling a local list and sharing hashed versions of relevant portions of the list, thereby increasing the overall computational efficiency and improving the overall power consumption of the system.

In one example of the techniques described herein, a method includes maintaining, by a first network security appliance of a plurality of network security appliances, a local user list comprising first user identifier records for accessing a network, wherein the local user list has a predefined format; receiving, by the first network security appliance, at least a portion of a non-local user list comprising second user identifier records for a second network security appliance of the plurality of network security appliances; comparing, by the first network security appliance, the local user list with at least the portion of the non-local user list received from the second network security appliance to identify one or more deviations; merging, by the first network security appliance, the portion of the second user identifier records of the non-local user list corresponding with the one or more deviations with the first user identifier records of the local user list to generate an updated local user list; and authenticating, by the first network security appliance, a request to access the network using the updated local user list.

In another example of the techniques described herein, a first network security appliance includes one or more processors; and a storage device configured to store one or more modules operable by the at least one processor to: maintain a local user list comprising first user identifier records for accessing a network, wherein the local user list has a predefined format, wherein the network comprises a plurality of network security appliances that includes the first network security appliance; receive at least a portion of a non-local user list comprising second user identifier records for a second network security appliance of the plurality of network security appliances; compare the local user list with at least the portion of the non-local user list received from the second network security appliance to identify one or more deviations; merge the portion of the second user identifier records of the non-local user list corresponding with the one or more deviations with the first user identifier records of the local user list to generate an updated local user list; and authenticate a request to access the network using the updated local user list.

In another example of the techniques described herein, a non-transitory computer readable storage medium stores instructions that, when executed by one or more processors of a first network security appliance, cause the one or more processors to maintain a local user list comprising first user identifier records for accessing a network, wherein the local user list has a predefined format, wherein the network comprises a plurality of network security appliances that includes the first network security appliance; receive at least a portion of a non-local user list comprising second user identifier records for a second network security appliance of the plurality of network security appliances; compare the local user list with at least the portion of the non-local user list received from the second network security appliance to identify one or more deviations; merge the portion of the second user identifier records of the non-local user list corresponding with the one or more deviations with the first user identifier records of the local user list to generate an updated local user list; and authenticate a request to access the network using the updated local user list.

The details of one or more examples of the disclosure are set forth in the accompanying drawings and the description below. Other features, objects, and advantages of the disclosure will be apparent from the description and drawings, and from the claims.

5 BRIEF DESCRIPTION OF THE DRAWINGS

The features of the present disclosure will best be understood from a detailed description of the techniques and example examples thereof selected for the purposes of illustration and shown in the accompanying drawings in which.

Figure 1:
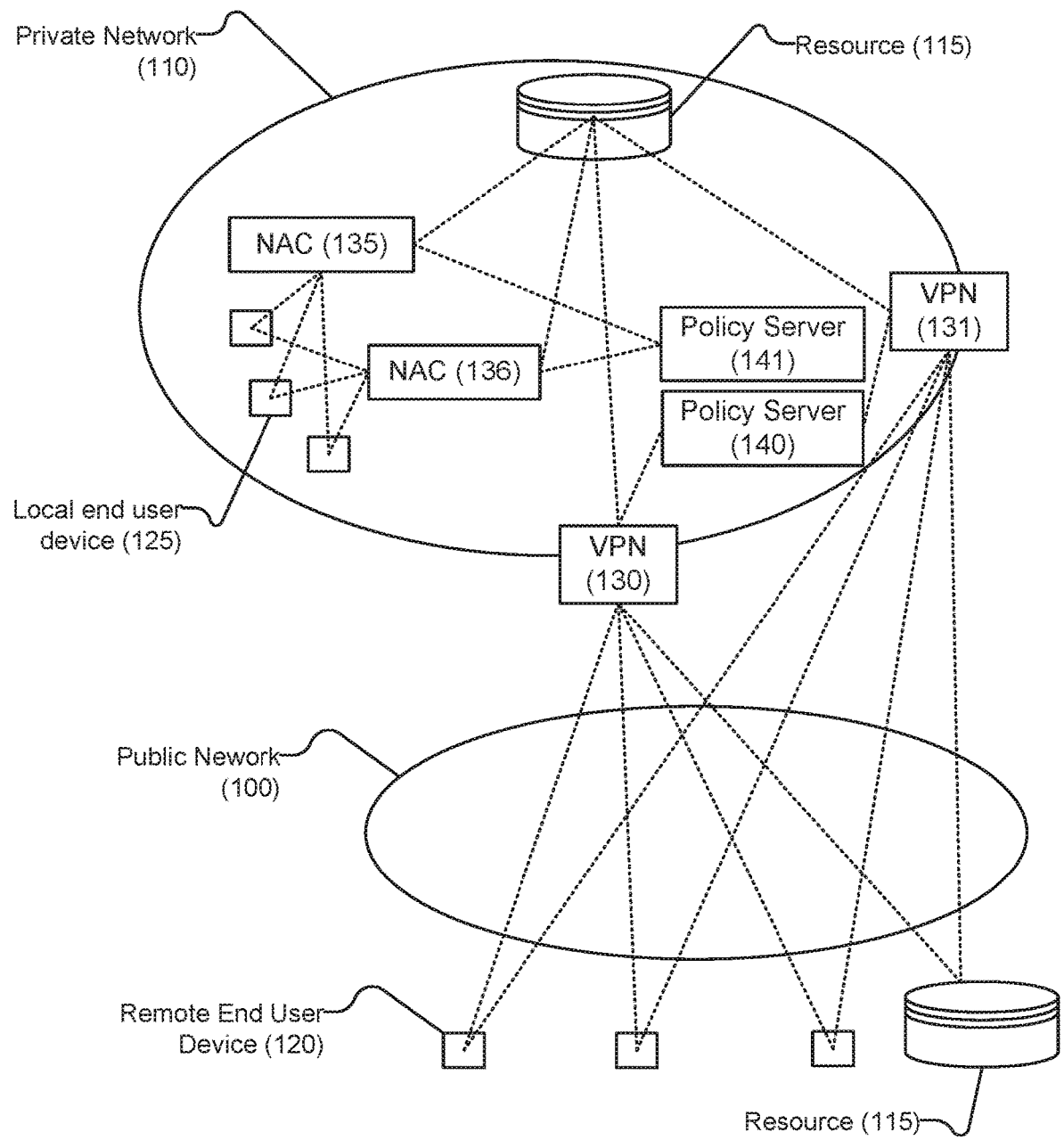
FIG. 1 depicts an example schematic diagram of a network environment according to an aspect of the present disclosure.

These and other aspects and advantages will become apparent when the Description below is read in conjunction with the accompanying Drawings.

6 DETAILED DESCRIPTION

6.1 Definitions

The following definitions are used throughout, unless specifically indicated otherwise:

| TERM | DEFINITION |
| --- | --- |
| SSL | Secure Socket Layer |
| VPN | Virtual Private Network |
| NAC | Network Access Controller |
| Firewall Device | A hardware device or software operating on a device that monitors incoming and outgoing network traffic and decides whether to allow or block the network traffic based on predetermined criteria |
| Hash function | A function that can be used to map data of arbitrary size to a given hash value. |

6.2 Item Number List

The following item numbers are used throughout, unless specifically indicated otherwise.

| # | DESCRIPTION |
| --- | --- |
| 100 | Public Network |
| 110 | Private Network |
| 115 | Resource |
| 120 | Remote end user device |
| 125 | Local end user device |
| 130 | VPN |
| 131 | VPN |
| 135 | NAC |
| 136 | NAC |
| 140 | Policy server |
| 141 | Policy server |
| 320 | Attribute |
| 330 | Records |
| 410 | User list |
| 420 | User name record |
| 422 | Two records (insufficient number to form a hash block) |
| 425 | Hash block group |
| 427 | Hash function |
| 429 | Hash block |
| 605 | Hash block |
| 610 | Hash block |
| 615 | Hash block |
| 620 | Hash block |
| 625 | Hash block |
| 630 | Hash block |
| 635 | Hash block |
| 640 | Hash block |
| 710 | User device |
| 720 | Resource |
| 730 | Gateway 1 |
| 740 | Gateway 2 |
| 750 | First network link |
| 755 | Second network link |
| 760 | Third network link |
| 765 | User List Manager |
| 770 | Fourth network link |
| 780 | Public Network |

6.3 Detailed Description

In general, the techniques described herein enable a virtual private network (VPN) system or a network access control (NAC) system with multiple network security appliances to each maintain respective local user lists and to share hashed portions of the respective local user lists across the various network security appliances. As such, there may not be a master list maintained by any single network security appliance, but rather a smaller, local list maintained at the respective network security appliance storing the local list. The techniques described herein address shortcomings of the prior art by providing a synchronization method for more rapidly and accurately synchronizing extremely large lists without transmitting the list to a master device or to peer devices and without merging the complete list. Moreover, the present disclosure provides a method for synchronizing lists that more uniformly distributes processor utilization over all of the network appliances instead of burdening the master appliance with most of the processor resource utilization.

For instance, in one conventional update method, the network appliances identify a single master appliance or a quorum of appliances that can take on the role of master, to synchronize with. The master periodically receives user lists from each of a plurality of slave network appliances and merges the list to create a master list. The master list is then distributed by the master appliance back to each slave appliance. However, this synchronization method consumes considerable processing resources by the master appliance to merge the lists and consumes considerable network bandwidth to exchange individual and master lists for each update of the master list, especially when there is a need to update the master list every five minutes. By utilizing the techniques described herein, rather than assembling and distributing a master list at a central processor, each of the network security appliances may be tasked with handling a local list and sharing hashed versions of relevant portions of the list, thereby increasing the overall computational efficiency and improving the overall power consumption of the system.

FIG. 1 depicts an example schematic diagram of a network environment according to an aspect of the present disclosure. Referring to FIG. 1 a non-limiting network environment includes a public network (100), a private network (110) and one or more protected resources or services (115) of the private network or in some cases the protected resources are remote from the private network. The private network includes various network security appliances operated to enforce network security. The network security appliances can be dedicated hardware devices, e.g. Virtual Private Network (VPN) servers or concentrators (130, 131) or Network Access Controllers (NAC) (135, 136), or software programs operating on multifunctional network devices, e.g. a firewall program operating on a network switch or on a network router and or other software programs e.g. operating on virtual computer devices. Additionally, each Virtual Private Network (VPN) server or concentrator (130, 131) or Network Access Controller (NAC) (135, 136) may comprise a cluster of hardware devices, a cluster of virtual devices or a combination thereof. The Virtual Private Network (VPN) servers or concentrators (130, 131) or Network Access Controllers (NAC) (135, 136) may be geographically distributed over a town, a metropolitan area, a state, an entire country, or, in some cases, worldwide.

A first end user device may be classified as local end user device (125). A local end user device (125) requests access to the private network (110) from within the private network, e.g. through a wired or wireless network appliance access point that is operating as a node of the private network (110).

A second end user device may be classified as a remote end user device (120) which requests access to the private network from outside the private network, e.g. through a wired or wireless network appliance access point that is not operating as a node of the private network (110).

In one example, each remote end user device (120) includes a VPN client program operating on the remote end user device (120). The VPN client program is provided by the private network operator for installation on the remote end user device and is configured to recognize attempts by the remote end user device to request access to the private network (110) or other network resources protected by the network appliances of the private network, and to encrypt network traffic passing between the remote user device (120) and one or both VPN concentrators (130, 131). The VPN client and the VPN concentrators are also configured to encapsulate data packets being exchanged between the remote end user devices (120) and either one of the VPN concentrators (131, 132) with a VPN tunnel header. In one non-limiting example, data packets generated by a remote client device (120) that have a destination IP address corresponding with any IP address corresponding with the private network (110) or a resource (115) of the private network are intercepted by the VPN client operating on the end user device and reconfigured. The VPN client adds a VPN tunnel header to the data packet with the destination IP address of the VPN tunnel corresponding with the IP address of one of the VPN concentrators (130, 131). Additionally, the VPN client encrypts each data packet being routed to one of the VPN concentrators and the VPN concentrator encrypts each data packet being routed back to the remote end user device (120). Accordingly, any network traffic generated by any one of the remote end users (120) that includes a VPN client module operating thereon is encrypted and directed to one of the VPN concentrators (130, 131). Alternately, if a remote end user device does not include a VPN client, non-encrypted data packets having a destination IP address that is a destination IP address corresponding with any IP address of the private network (110) or a resource (115) of the private network may still reach one of the VPN concentrators (130, 131); however, the VPN concentrator may deny access to the private network or resource thereof and/or may provide further instructions to the remote end user device to bring the device into compliance with policies of the private network (110).

The VPN concentrator (130, 131) upon receiving a request for access to the private network (110) removes the tunnel IP header and determines the original destination IP address of the data packet. The VPN concentrator then initiates an authentication process to authenticate a username and password combination, which is carried out with encrypted data. Additionally, the VPN concentrator may check a license status of the end user to determine if the end user and the end user device have a valid usage license and that the terms of the license allow the requested access.

If the username and password are authenticated, and the license terms allow the requested access, the VPN concentrator may determine whether the remote end user device (120) is compliant with various policies of the private network (110), e.g. virus protection and malware detection software versions, type and version of other programs including operating system, mail system, or the like. Once the end user and the end user device are authenticated and deemed compliant, and validly licensed, the request for access is granted and the VPN concentrator (130, 131) decrypts the data packet and forwards the data packet to the original destination IP address listed therein; however the VPN concentrator may also alter the original data packet to direct responses to the original data packet back to the VPN concentrator to be encrypted and then routed back to the remote end user device (120).

In cases where the requested resource is outside the private network (110) the VPN concentrator (130, 131) establishes a secure connection with the resources and proxies all requests and responses between the end user device and the requested resource that is outside the private network (110).

In one example, each local end user device (125) includes a NAC client program operating on the local end user device (125). The NAC client program is provided by the private network operator for installation on the local end user device (125) and is configured to recognize attempts by the local end user device to request access to the private network (110) and can optionally encrypt network traffic passing between the local user device and one or both VPNs (130, 131). Alternately a local end user device (125) can access the private network through a NAC (135, 136) without a NAC client program, e.g. as a guest user or with a username and password that can be authenticated by the NAC.

The NAC (135, 136) upon receiving a request for access to the private network (110) initiates an authentication process to authenticate a username and password combination, or other user identifier or security token. Additionally, the NAC may check a license status of the end user to determine if the end user and the end user device have a valid usage license and that the terms of the license allow the requested access.

If the username and password are authenticated and the license terms allow the requested access, the NAC may determine whether the local end user device (125) is compliant with various policies of the private network (110), e.g. virus protection and malware detection software versions, type and version of other programs including operating system, mail system, or the like. Once the end user and the end user device are authenticated and deemed compliant, and validly licensed, the request for access is granted and the NAC forwards the data packet to the destination IP address listed in the request for access.

A network security appliance operating as a policy server (140) is optionally included and utilized by the VPN concentrators (130) and (131) to evaluate remote end user devices (125) and to define user roles and access realms corresponding with the end user of remote end user devices. The policy server (140) maintains its own local user list and participates in user list synchronization or merges described below. The policy server tracks session identifies, e.g. cookies, corresponding with communication sessions that are authenticated by the VPN concentrators (130) and (131) and may associate session identifier information with each authentication event. Similarly, a policy server (141) is optionally included and utilized by the NACs (135) and (136) to evaluate local end user devices (125) and to define user roles and access realms corresponding with the local end user. The policy server (141) maintains its own local user list and participates in user list synchronization or merges described below. The policy server (141) tracks session identifies, e.g. cookies, corresponding with communication sessions that are authenticated by the NACs (135) and (136) and may associate session identifier information with each authentication event.

Figure 2:
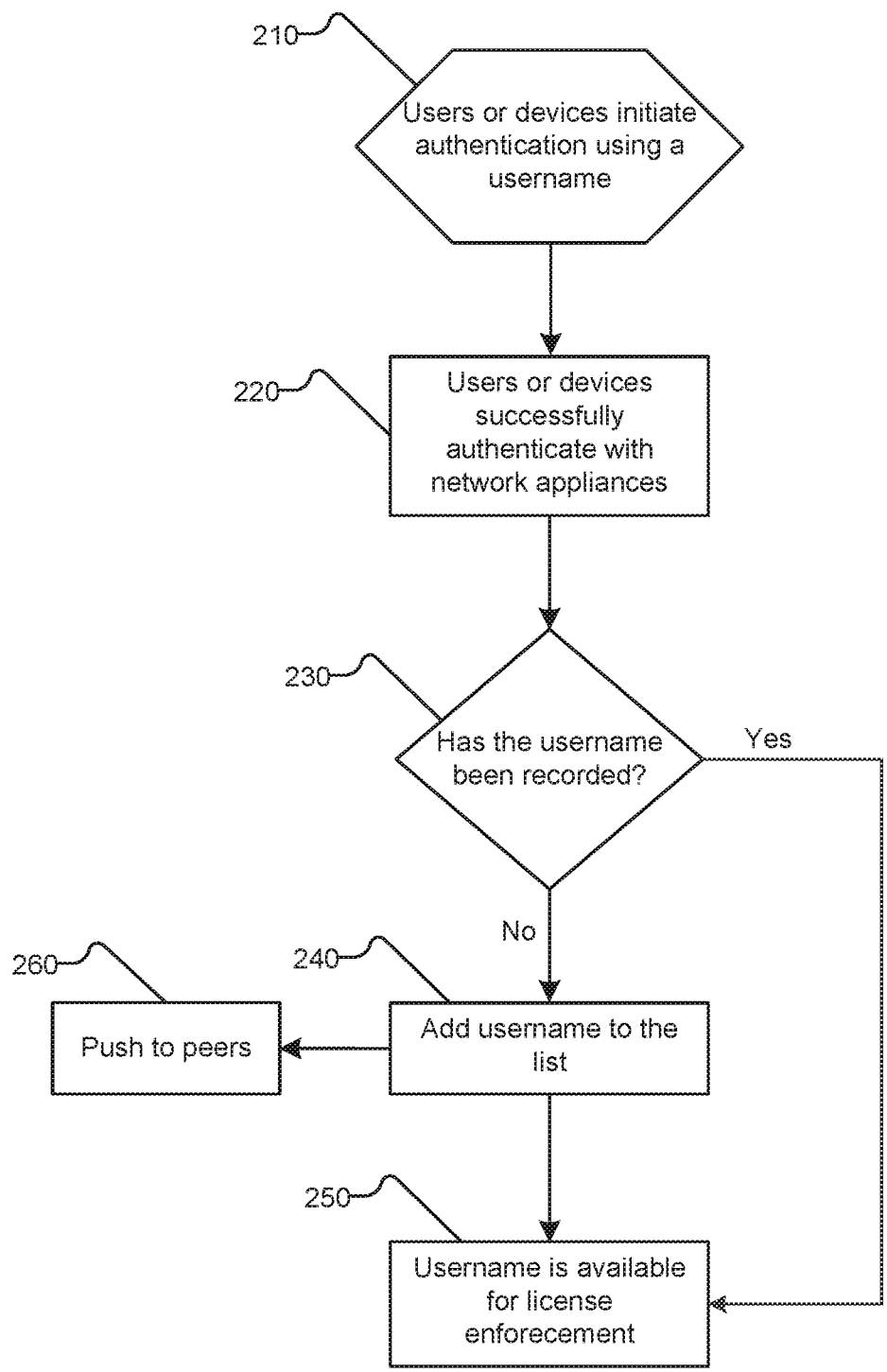
FIG. 2 depicts a process flowchart depicting a network device authentication event according to an aspect of the present disclosure.

FIG. 2 depicts a process flowchart depicting a network device authentication event according to an aspect of the present disclosure. Referring to FIG. 2, each network security appliance monitors incoming network traffic received from end user devices, e.g. when an end user device requests access to the private network (110) or to a specific service or protected resource (115) of the private network. As noted above some of these requests are directed to a network security appliance by a VPN client or a NAC client, however requests for access to the private network also can come directly from a web browser, mail client, or other applications operating on an end user device with the request for access being routed to one of the network security appliances by an autonomous system using a conventional routing protocol, such as is the case with the public network (100). In most instances, no matter the source device or the program operating on the source device used to generate of the request for access, each network appliance, e.g. Virtual Private Network (VPN) servers or concentrators (130, 131) and/or Network Access Controllers (NAC) (135, 136), or the like, initially prevents the requested access to the private network (110) until the user of the end user device, i.e. the end user, is authenticated as an end user that is authorized to access the private network (110). In most cases this means the end user provides a registered username and password, or other digital secure access token, identifier, or the like, as shown in step (210) of FIG. 2. Once provided, an authentication procedure is initiated by the network security appliance to validate the username and password, or the like, and if the authentication is successful, the requested access is granted, for at least limited access to the private network (125), as shown in step (220). Thereafter, additional network security evaluations may be carried out by the network security appliance either alone or in combination with other network security appliances to evaluate the end user device for compliance with network policies, to assign or determine a user role and/or to determine which network realms and or resources that the end user can access and to evaluate license enforcement criteria. Upon successful completion of all required security checks, the end user is granted access to one or more resources of the private network (110).

Each network security appliance, e.g. VPN's and NAC's, includes a data processor, a memory device for storing digital data and one or more network interface devices. The data processor and memory include a plurality of operating programs, applications, or the like operating thereon to perform logic steps corresponding with desired network security outcomes. One desired outcome is that each network security appliance maintains a user list that includes a username record corresponding with each authentication event that is performed by the network security appliance. Each network security appliance is also configured to share all or a portion of the user list maintained thereby and to replace all or a portion of the user list stored thereby with a merged user list or a portion of a merged user list wherein the merged user list includes the combined user list entries made by all network security appliances.

Once access is granted to the network resource, the network security appliance operating as an access point parses the user list maintained thereby to determine if the username, or other identifier, is already included in the user list, as shown in step (230). If the username is included in the user list, the username is made available for license enforcement, as shown in step (250) and the process ends. If the username is not included in the user list the username is added to the user list, as shown in step (240). Alternately, each network security appliance maintains an index keyed on username which is used to check if a record corresponding with the username already exists. After step (240) the username added to the user list is made available for license enforcement, step (250), and the newly entered user list record is optionally pushed to one or more other network appliances to be added to the user lists maintained thereby, as shown in step (260).

Figure 3:
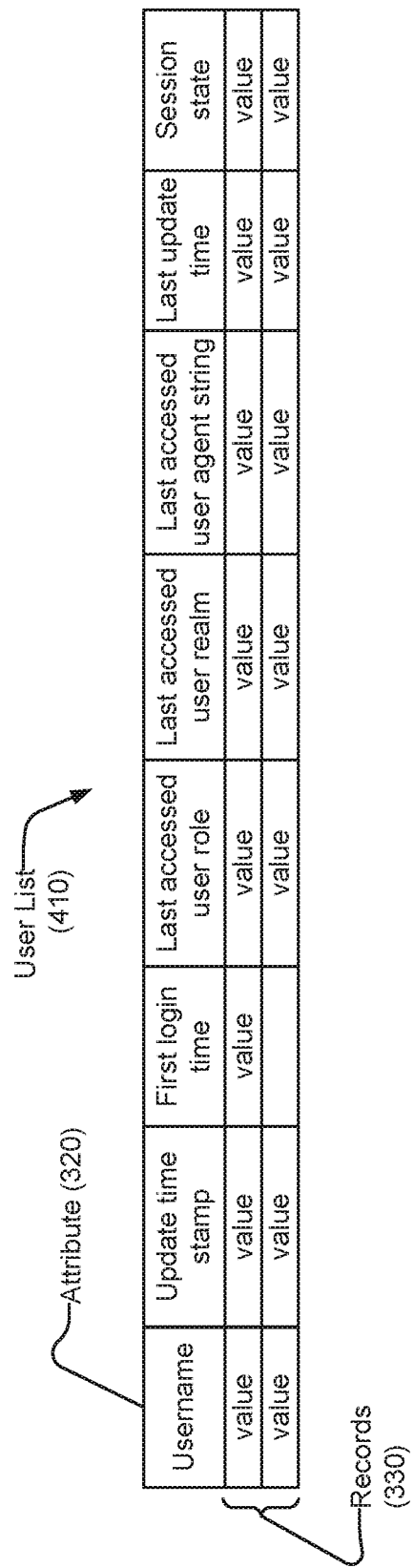
FIG. 3 depicts an example schematic diagram of a user list that includes attribute values corresponding with authentication events according to an aspect of the present disclosure.

FIG. 3 depicts an example schematic diagram of a user list that includes attribute values corresponding with authentication events according to an aspect of the present disclosure. Referring to FIG. 3, a user list example includes attributes of the end user access session shown as column headers. In one example, the attributes include username, update time stamp, first log in time, last accessed user role, last accessed user realm, last accessed user agent string, last update time, record status, or the like. Each record includes values corresponding with one or more of the listed attributes, e.g. the username, a user agent string, a status, e.g. active, inactive, modified, etc. As described in FIG. 2 a new record is initiated if no prior record corresponding with the username is found in the existing user list. If a prior record corresponding with the username already exists, the prior record is updated, e.g. to change, add, or delete attribute values when appropriate. Accordingly, each network appliance initiates a new record in its own user list when the username corresponding with a request for access to resources is not in its own user list and the network appliance continues to update values of each username record that is included in its own user list as more information becomes available.

Session Migration

After an end user device is granted access to a requested resource, a communication session ensues and may continue indefinitely. During the session, the network security appliance that authenticated the session monitors the communication session and may record updates, e.g. last update time, or changes to last accessed user realm, or the like and the session status may be changed to modified. If the communication session is terminated either by one of the participating devices or due to a time-out based on inactivity, the network security appliance that authenticated the session can change the session status to terminated. However, in some instances, the communication session can migrate from one network security appliance to another network security appliance without the communication session ending. One example of this is when the communication session is initiated on a network security access point, e.g. a NAC (135, 136) and then immediately passed to another network appliance that is administering the requested service, e.g. a mail server, or the like. Thereafter the communication session is continued between the end user device and the mail server. In this instance, the NAC and the mail server each adds a new username record to the user list being generated thereby with a first login time and other attributes; however, at least initially, neither device is aware of details of the username record of the other device. In another session migration example, the communication session is initiated on a network security access point, e.g. a first NAC (135) and then during the same communication session, passed from the first NAC (135) to a second NAC (136) simply because the end user device switches from a wireless network access point to wired network access point. Thereafter the communication session is continued between the end user device and the requested resource through the second NAC (136). In this instance, each of the first NAC (135) and the second NAC (136) adds a new username record to the user list being generated thereby with a first login time and other attributes; however, at least initially, neither device is aware of details of the username record of the other device. Another example of session migration is when the communication session is initiated on a first VPN concentrator (130) and then during the same communication session, the communication session is passed from the first VPN concentrator to a second VPN concentrator (131) due to a network failure, bottleneck, or other reason why the data traffic is switched from one VPN handler to another. In this instance, each of the first VPN (130) and the second VPN (131) adds a new username record to the user list being generated thereby; however, at least initially, neither device is aware of details of the username record of the other device.

Figure 4:
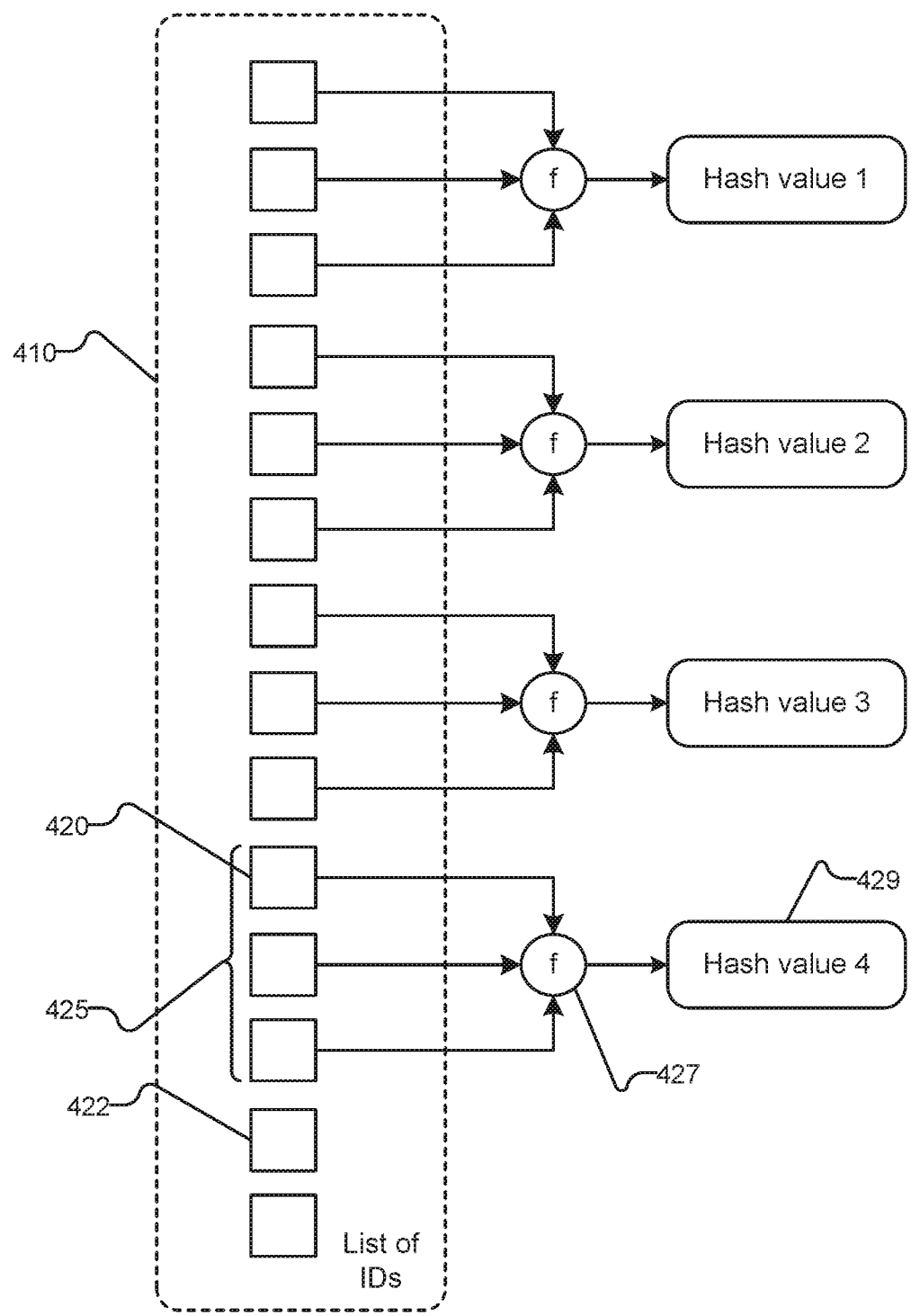
FIG. 4 depicts an example schematic diagram depicting a user list divided into a plurality of hash blocks with each hash block associated with a hash block function generating a hash value corresponding with the user list content corresponding with the hash block according to an aspect of the present disclosure.

FIG. 4 depicts an example schematic diagram depicting a user list divided into a plurality of hash blocks with each hash block associated with a hash block function generating a hash value corresponding with the user list content corresponding with the hash block according to an aspect of the present disclosure. Username records (420) of the user list (410), created and maintained by each individual network appliance, are grouped into hash blocks (425) by a hash block grouping module operating on each network security appliance. In the present example, each username record (420) includes at least two values, such as the username, or other user identifier, and the first log in time, such as a time stamp corresponding with the time that the username record is created, which as noted above follows authentication and initial access to the private network (110). Other attribute values are added to the username record (420) if they are available when the username record is created. Thereafter, the network security appliance periodically updates all username records (420) with new attribute values when attribute updates are available. After a prolonged period of inactivity, username records may be deemed inactive and the record status is changed to inactive; however, the relevant data, e.g. username and first log in time, remain part of the username list.

The format of each username record format of the values entered into each record are preconfigured across all network security appliances such that each network security appliance, given the same circumstances, e.g. same username, same time stamp, same user role, same agent string, etc. will generate an identical username record. Likewise, the configuration of the user list (410) is preconfigured across all network security appliances such that each network security appliance, given the same circumstances, will sort the user list (410) in the same sort order using the same sort rules and other parameters as may be required to generate an identical user list (410) across all network appliances.

Hash Blocks

According to a non-limiting example, each network security appliance is configured to divide or group the user list into data blocks or hash blocks (425). The configuration of each hash block (425) is part of a pre-shared configuration by all participating network security appliances. The hash block configuration is tuned based on performance requirements, as fewer usernames per hash block, would imply more block hashes or hash values, and more network overhead, during reconciliation. Too many usernames in a block would imply higher odds of diverged hashes or block values. In one example, applicants prefer that each hash block include the same number of username records of about 1000 usernames per hash block when the total number of user records is greater than about twenty thousand; however, the number of usernames per hash block is use case dependent. In another example hash block configuration, the user records are sorted by first login time and each hash block is configured to include user records corresponding with a different predefined time interval, e.g. based on data and coordinated universal time. In another example hash block configuration, the username records are sorted by an alphanumerical criterion and the sorted list is divided or grouped into hash blocks according to a characteristic of the sort order, e.g. all user records having a username that starts with the letter A are grouped into the same hash block. Thus, in various examples, the number of user records per hash block may be the same or different. Moreover, in some instances, not all user records will be matched to a hash block, e.g. as is shown in FIG. 4 where two records (422) are not grouped with a hash block because each hash block (429) requires three user records.

Hash Block Merge

Figure 5:
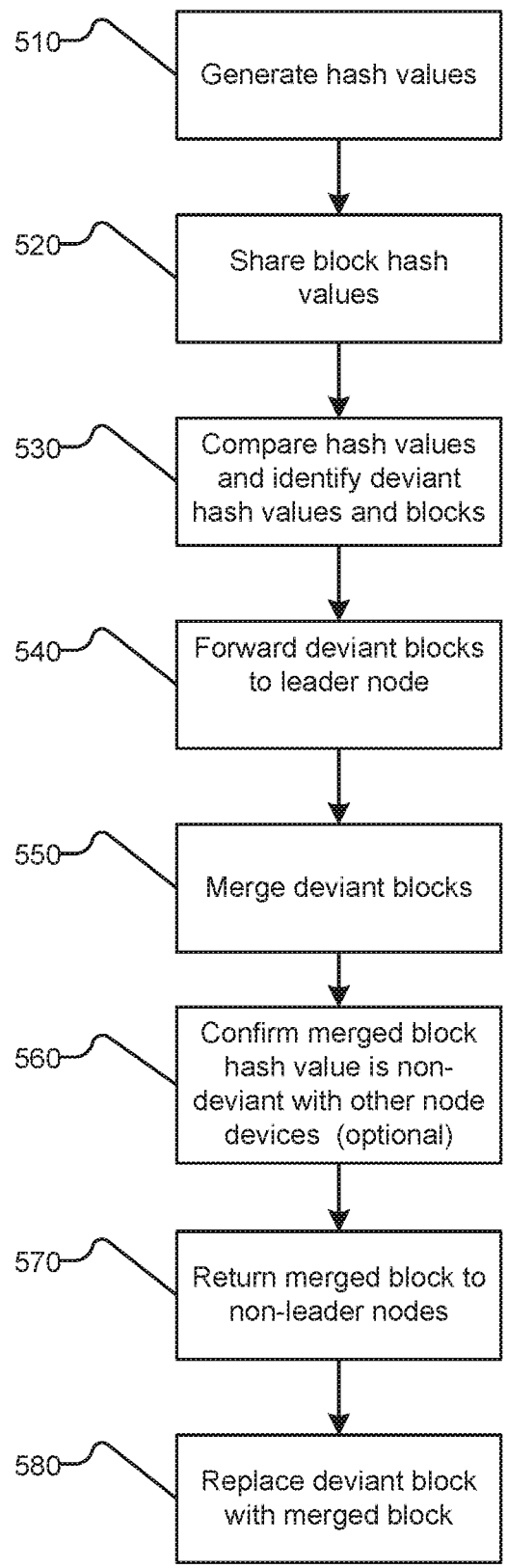
FIG. 5 depicts a process flowchart for comparing hash values corresponding with same hash block sets over a plurality of network appliances and for reconciling the hash block content of the same hash block sets when at least one hash value of the hash block set is deviant.

FIG. 5 depicts a process flowchart for comparing hash values corresponding with same hash block sets over a plurality of network appliances and for reconciling the hash block content of the same hash block sets when at least one hash value of the hash block set is deviant. According to an aspect of the present disclosure, the user list (410) of each network security appliance is compared to the user list of other network security appliances according to the steps set forth in a process diagram depicted in FIG. 5. In a first step (510), hashes or hash values may be generated for each hash block (429) of the user list (410) by applying a hash function (427) to the portion of the user list content contained in the hash block. Preferably, the first step (510) is performed by each network security appliance that includes a local user list (410) or that wishes to initiate or update a local user list. Each network security appliance may be configured to carry out step (510) simultaneously, e. g. on a time schedule, or step (510) can be initiated by a system, administrator, e. g. by a broadcast message, or can be initiated in response to an event, e.g. a network partition or the like.

Figure 6:
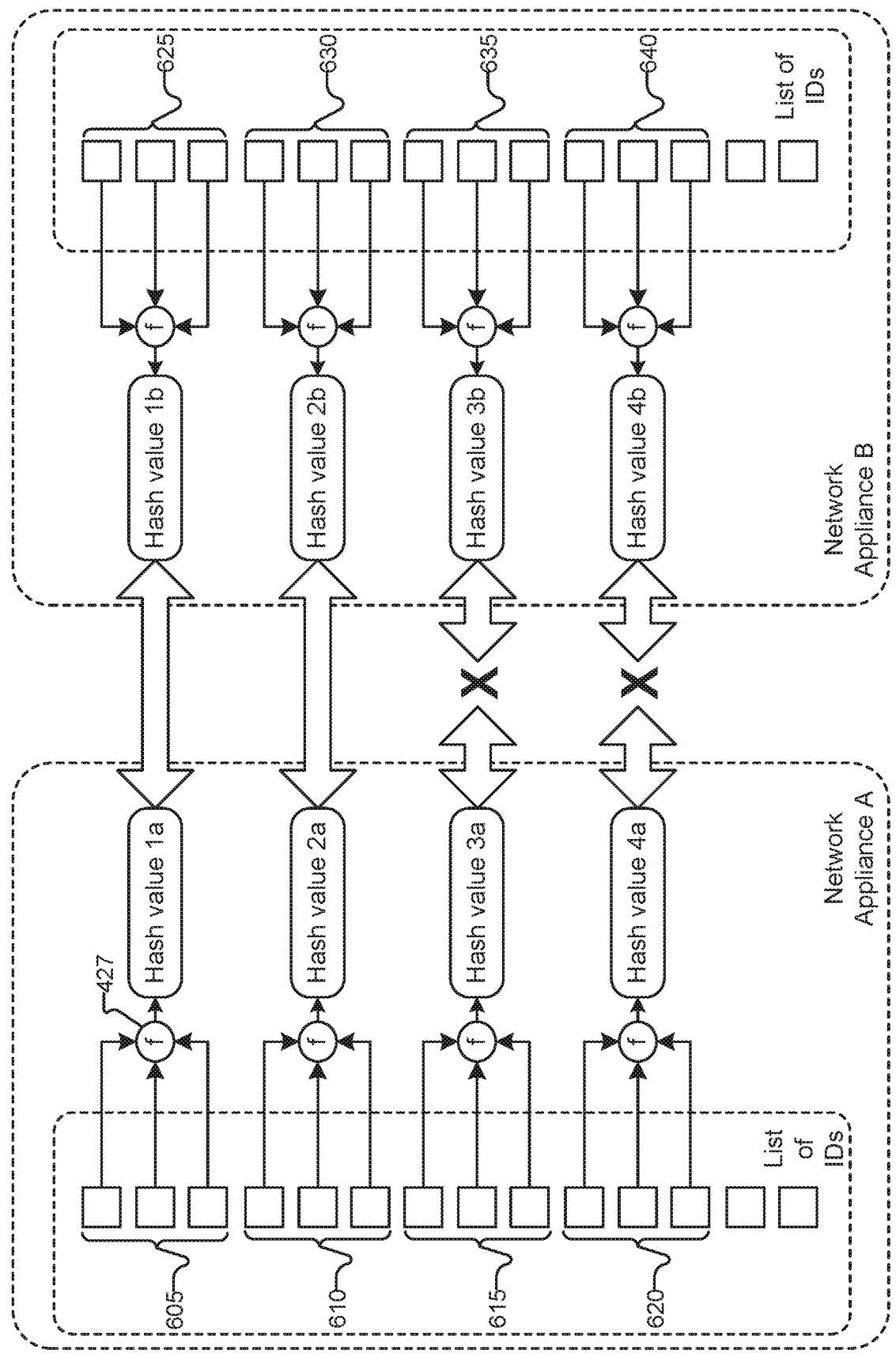
FIG. 6 depicts an example schematic diagram of two network appliances sharing hash values of same hash block pairs according to an aspect of the present disclosure.

FIG. 6 depicts an example schematic diagram of two network appliances sharing hash values of same hash block pairs according to an aspect of the present disclosure. In the non-limiting example shown in FIG. 6, network security appliance (A) may apply a predetermined hashing function (f) (427) to each of its hash blocks (605, 610, 615, 620) while network security appliance (B) applies the predetermined hashing function (f) to each of its hash blocks (625, 630, 635, 640). While this is a simplified example, in a large network, step (510) may involve any number of network security appliances (e.g., tens of hundreds) applying the hashing function to hash blocks stored on each network security appliance. A preferred hashing function (427) is a Message-Direct (MD)5 hashing function that produces a 128-bit hash value which is usable as a checksum to verify data integrity of one hash block (429) with another hash block (429) when both hash blocks contain the same data content. Other hash functions are usable without deviating from the techniques of this disclosure.

After the hash values are determined, each network security appliance locally stores a hash value corresponding with each local hash block. In step (520), the network security appliances may share the hash values across the multiple network security appliances. In a peer sharing method, each network security appliance shares hash values with one or more peer network security devices. In the example of FIG. 6, the network appliances A and B are peers and share hash values with each other. If the network appliances A and B are part of a larger group of peer devices, each peer device shares hash values with one or more of its peer devices. In a leader node sharing method, a group of network security appliances designate a leader node, with the remaining network security appliances of the group being designated as follower nodes, and each follower node shares its local hash values with the leader node. If instead of designating a leader node, the group of network security appliances includes a dedicated user list server appliance (765) configured to store and maintain a master user list for the group of network security appliances, then each network appliance in the group sends its local hash values to the dedicated user list server appliance (765).

In step (530), the hash values of each network security appliance in the group may be compared with the hash values of one or more other network security appliances. In the case of the peer sharing methods, each peer device compares it local hash values with hash values received from peer devices. Each peer device may then determine on a hash block by hash block basis if the local hash values match the hash values received from each peer or if the local hash values of one or more local hash blocks are deviant as compared to hash values received from one or more peer devices. If all the hash values match across all the compared network security appliances, the user lists of all the compared network security appliances, in this case the peer devices, may be matched and there may be no need to reconcile any discrepancies in the user lists across the compared network security appliances. However, if one or more of the local hash values are deviant as compared with the hash values of any one of the other peer devices, then one or more of the peered network security appliances may have at least one hash block with a deviant hash value and the hash blocks corresponding with the deviant hash values are selected to be modified to reconcile the deviant hash values.

In a simplified non-limiting example shown in FIG. 6, each hash block (605, 610, 615, 620) may generate a hash value (1a, 2a, 3a, 4a) corresponding hash blocks of the network appliance A. The corresponding hash blocks of network appliance B (625, 630, 635, 640) may generate hash values (1*b*, 2*b*, 3*b*, 4*b*). In step (530), the corresponding hash values may be compared, (1a with 1*b*), (2a with 2*b*) (3a with 3*b*) and (4a with 4*b*) and so on for all hash block pairs in the network security appliances A and B. In one example, each network appliance requests hash values from one or more other network appliances and compares the values received from other network applicates with its own hash values to identify deviant hash values and the hash blocks corresponding therewith. In another example a leader node or a dedicated user list server appliance (765) may request or receive hash values from other network appliances and compares the hash values of all the network appliances. In this case, the leader node or user list server appliance identifies deviant hash values and the hash blocks corresponding therewith across all the network appliances. In the example of FIG. 6, the hash values (1a, 2a), corresponding with hash blocks (605, 610) are compared with the hash values (1*b*, 2*b*) corresponding with the hash blocks (625, 630) and are found to be matched. The hash values (3a, 4a), corresponding with the hash blocks (615, 620) are compared with the hash values (3*b*, 4*b*) corresponding with the hash blocks (635, 640) and are found to be deviant. Thus, the user list portion corresponding with hash blocks (605) and (625) and corresponding with the hash blocks (610) and (630) are confirmed to be matching user list portions, so there is nothing to be done. However, the user list portion corresponding with the hash blocks (615) and (635) and corresponding with the hash blocks (620) and (640) are confirmed to be deviant and need to be reconciled.

To reconcile the unmatched hash block pairs (615 and 635) and (620 and 640)), in step (540), each of the network security appliances A and B may request, from the other network appliance, the user list portion corresponding with hash blocks that have deviated hash values. In the example of FIG. 6, network security appliance A requests network security appliance B to send the contents of hash blocks (635) and (640) and network security appliance B requests network security appliance A to send the contents of hash blocks (615) and (620). Then in step (550) each of the network security appliances A and B may merge the contents of hash block (615) with the contents of hash block (635) and the contents of hash block (620) with the contents of hash block (640) by a preconfigured file merging technique. The merged contents provide a first merged hash block corresponding with the contents of hash blocks (615 and 635) and a second merged hash block corresponding with the contents of hash blocks (620 and 640). During the merge, no records are removed; however, records may be added or modified, and the record status can be changed. After the merging step (550), the contents of the merged hash blocks may be compared in step (560) when each of the network security appliances A and B applies the hash function (427) to generate a new hash value corresponding with the merged hash blocks. Thereafter the new hash values are exchanged between the network security appliances A and B to confirm that the merged hash blocks are indeed matched. In a final step (580), each of the network security appliances A and B may replace the hash blocks corresponding with deviant hash values (615, 635, 620, 640) with the first and second merged hash blocks.

In the case where the network appliances have a leader node and follower nodes or a dedicated user list server appliance (765) and follower nodes, the step (520) may relate to each follower node sending its local hash values to the leader node or dedicated user list server appliance. Then step (530) may be carried out by the leader node or dedicated user list server appliance which identifies deviant hash values and corresponding hash blocks across all the follower nodes and may request that each follower node send deviant hash block content to the leader node or dedicated user list server appliance in step (540). Thereafter, the merging step (550) may be performed by the leader node or dedicated user list server appliance which may also perform step (560) by determining a new hash value for each merged hash block. Then in step (570), the leader node or dedicated user list server appliance may return merged hash blocks to the follower nodes and each follower node may perform step (580) by inserting merged hash blocks in the appropriate portion of the user list. Thereafter the leader node or dedicated user list server appliance can request the follower nodes to regenerate hash values based on the updated user list to confirm that there are no deviant hash values.

Example Merge

In one merge example, a first username record having a first username u1 and a first login time of t1 is included in a hash block (4*a*) of the network security appliance A. A second username record having the same first username u1, and a different first login time t2 is included in a hash block (4*b*) of the network appliance B. Thus, records for the username u1 already exist on both network security appliances so a new record for username u1 is added to either machine. However, each of the first username record and the second username record is modified, e.g. to include the same first login time, so that the first and second username records are identical. If other attribute values also differ between the two username records the other attribute values are modified to make the two records match. During the merge process, the record status can be changed. In one example where both records are modified, the record status of both records can be indicated as modified. In another example, one of the username records may indicate that the communication session was terminated with a last time listed. In this case one or both records are modified to update dissimilar attribute values so that the two records match; however, the status of both records is modified to invalid, or the like, because there is no active communication session corresponding with the username u1. In further hashing steps, invalid records are not included when determining a hash value.

In cases where a leader node has been designated, the step (520) may be carried out by each follower node by sending hash values to the leader node. Step (530) may be carried out by the leader node which identifies all the deviant hash values in the group and may then perform step (540) by requesting the follower nodes to send the username records corresponding with hash blocks that have deviant hash values to the leader node. The leader node may then carry out step (550) by merging the username records corresponding with hash blocks that have deviant hash values received from all the follower nodes, including its own local username records corresponding with the hash blocks that have deviant hash values, into a merged user list corresponding with each hash block that was found to have a deviant hash value. The merged user list corresponding with the hash blocks may then be returned to the follower nodes in step (570), and each follower node and the leader node, in step (580), may insert the merged user list into appropriate locations of the user list. As indicated by optional step (560) the step of generating hash values can be repeated based on all hash blocks or just the merged user lists corresponding with hash blocks that had deviant hash values to verify that that the local username list of every network security appliance has been synchronized and includes all username data that is collectively available from the network security appliances.

In one example, the hash blocks are merged on a regular schedule. In one example, the process shown in FIG. 5 is repeated every two to twenty minutes. In other examples, the process of FIG. 5 may be repeated continually, e.g. after merging all of the deviated hash blocks, the leader node restarts the process. Other examples include those such as FIG. 7, which depicts an example schematic diagram of a portion of a network environment that includes a dedicated user list appliance and a leader node and follower node arrangement according to an aspect of the present disclosure. In such examples the leader node is a dedicated network appliance, e.g. a user list manager (765), shown in FIG. 7, configured to carry out the user list merging process without generating its own user list.

Figure 7:
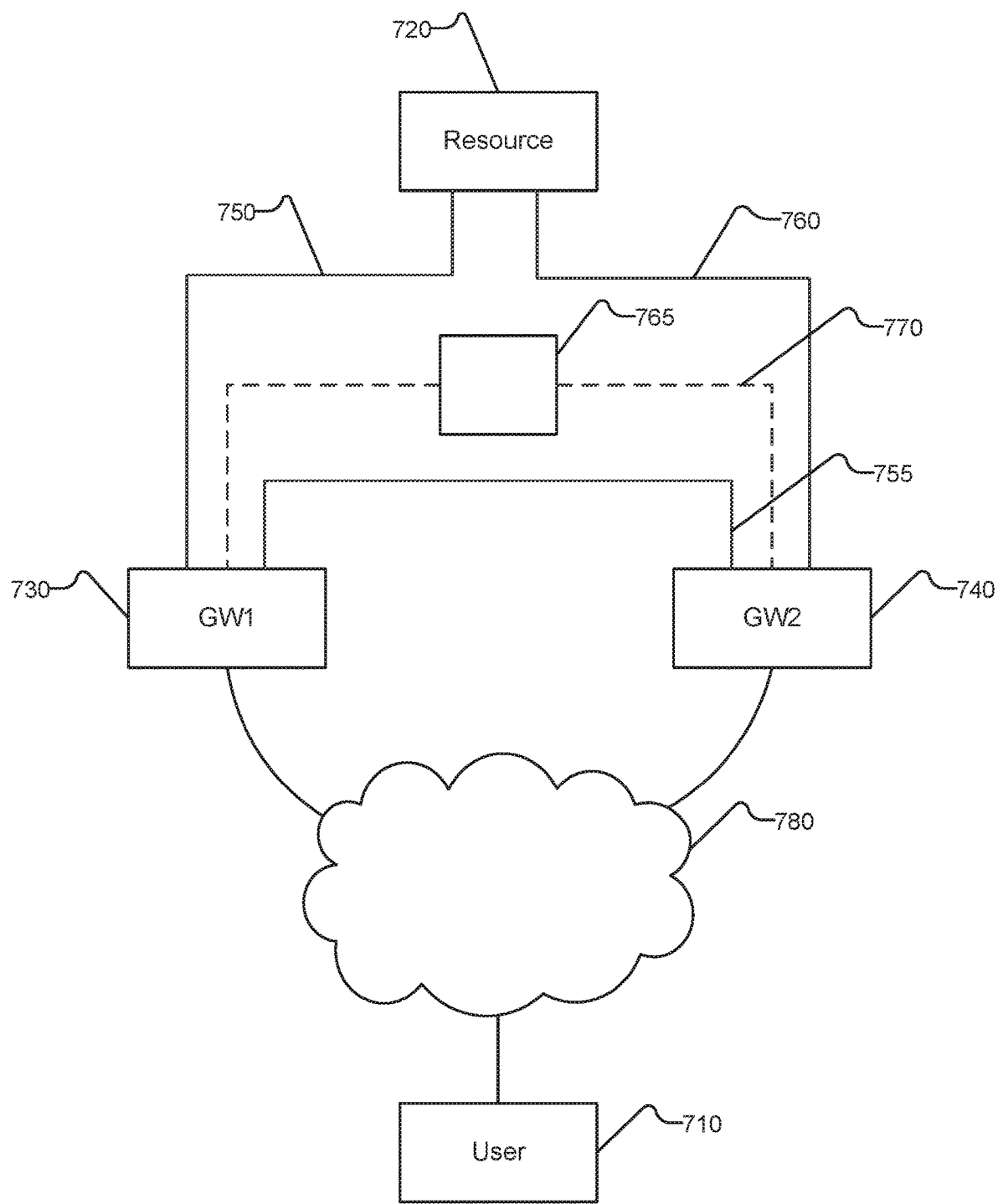
FIG. 7 depicts an example schematic diagram of a portion of a network environment that includes a dedicated user list appliance and a leader node and follower node arrangement according to an aspect of the present disclosure.

Referring to FIG. 7, an example use case is provided. An end user device (710) operated by a user, having a username, requests access to a protected resource (720) which can only be reached when the request for access is intercepted by one of two gateways (730) or (740). In the present example, the user device (710) has access to a public network (780) such as the Internet or worldwide web. A first user request is routed though the public network (780) and reaches the first gateway (730). The first gateway is operated to authenticate the username and to grant access to the resource (720) over a first network link (750).

The first gateway (730) generates a username record (420) corresponding with the authentication event and enters attribute values such as the username, first login time, etc. into the username record. The user list (410) configuration is preconfigured including dividing the user list into hash blocks (429). The second gateway (740) acts as a leader node and the first gateway (730) is a follower node. At a designated time or based on a command from the leader node (740), the leader node and follower nodes (730) generate hash values and send the hash values to the leader node (740) over a second network link (755). The leader node (740) compares the hash values and identifies deviant hash values and the hash blocks corresponding with the deviant hash values. The leader node then requests from each follower node the username records corresponding with hash blocks that have deviant hash values. The leader node then reconciles differences in the username records, hash block by hash block, by merging the username records corresponding with each hash block that had a deviant hash value into a merged user list corresponding with the hash block. As a result of the hash block merging process, the username record corresponding with authenticating the user device (710) to access the resource (720) is now also listed on the user list maintained by the second gateway (740).

At some point during the communication session between the user device (710) and the resource (720) access to the first gateway (730) is either lost or becomes less desirable than access to the resources (720) through the second gateway (740). As a result, network traffic exiting from the user device (710) arrives at the second gateway (740). In response to the incoming traffic, the second gateway checks the user list table stored thereon and finds that the user device (710) has already been authenticated and granted access to the resource (720) based on an authentication of a username that is listed in the local user list of the second gateway (740). The second gateway (740) therefore allows the communication session between the user device (710) and the resource (720) to continue over a third network link (760) and continues to update the user record corresponding with the user device (710). If access to the first gateway (730) is returned, the communication session between the user device (710) and the resource (720) may continue over one or both of the first and third network links (750) and (760) without interruption.

Dedicated Network Appliance

In a further example, a dedicated network appliance e.g. a user list server (765) is interfaced with each of the first gateway (730) and the second gateway (740) over a network link (770). The dedicated network appliance (765) is configured to carry out the hash block merge process shown in FIG. 5. In this example each of the first and second gateways (730) and (740) comprises a cluster of gateways and/or other network appliances each maintaining its own user list according to preconceived user list rules and preconceived hash block configurations.

In one non-limiting example, the user list server (765) acts as the node leader but without having other duties. Thus, in this example, the user list server (765) maintains a master user list divided into hash blocks, wherein the master user list is based on merged user lists corresponding with past hash block merge events. A hash block merge begins when the first gateway (730) and the second gateway (740) generate hash values and forward the hash values to the user list server (765). The user list server (765) determines which deviated hash values relate to which hash blocks on which of the first gateway (730) cluster and the second gateway (740) cluster and requests from corresponding cluster devices the block data corresponding with the deviated hash blocks. Once received, the dedicated network appliance (765) merges the deviated hash block data with the master user list to produce a merged master user list comprising merged hash block content for each hash block. Thereafter the user list server (765) sends appropriate merged hash block content to cluster devices that had deviated hash values.

In a further example, the user list server (765) maintains a master user list based on eligible usernames. The master user list is initiated and maintained by an administrator of the private network (110). The administrator can add, remove, and modify username records of the master user list. The master user list can include user device information corresponding with the username, e.g. a list of user devices that have valid use licenses, or a list of forbidden devices, or the like. The user list server (765) is configured to maintain a transaction log that records each modification of the master list including a time stamp, transaction ID, or the like.

Network security appliances work cooperatively with the user list server (765) to collectively manage the master user list. Initially the current master user list is distributed to each network security appliance, e.g. (730, 740). During an authentication process, the username is determined from the end user device, and the network security appliance determines if a record corresponding with the username exists on its local master user list. If yes, the end user is provided access when the username is authenticated, and the existing username record is modified, e.g. to add a first login time and other attribute values to the local user list. If the local user list is modified, the network security appliance is operated to change the record status to modified and to periodically push modified username records to the user list server (765). Upon receiving modified user name records, the user list server (765) updates the master user list and the transaction log. Each network security appliance (730, 740) periodically requests a master username list update from the user list server (765). The update request includes the transaction log time stamp or transaction ID corresponding with the last time the network security appliance received an update to the master username list. Based on the transaction log time stamp or transaction ID the user list server (765) prepares an update that only includes changes to the username master list since the transaction log time stamp or transaction ID. The update can be a compressed data file. The user list server (765) also operates to eliminate non-relevant data from the update, e.g. when a new username was added and then deleted since the last update those transactions are not included in the update because they are no longer relevant. In this example, the master user list is more closely managed by programs operating on the user list server (765) and by network administrators. The goal of this closer user list management is to reduce the size of the master user list and improve the relevance of the master user list to current users. In various operating modes the user list is culled to remove non-frequent users, to remove users of particular device types, or the like.

In accordance with the techniques described herein, a first network security appliance of a plurality of network security appliances may maintain a local user list comprising first user identifier records, wherein the local user list has a predefined format. The first network security appliance may receive at least a portion of a non-local user list comprising second user identifier records for a second network security appliance of the plurality of network security appliances. The first network security appliance may compare the local user list with at least the portion of the non-local user list received from the second network security appliance to identify one or more deviations. The first network security appliance may merge the portion of the second user identifier records of the non-local user list corresponding with the one or more deviations with the first user identifier records of the local user list to generate an updated local user list.

In some examples, the first network security appliance may divide the local user list into one or more hash blocks, wherein each of the one or more hash blocks is configured according to a predefined hash block format to include a different respective portion of the user identifier records. In some such examples, for each of the one or more hash blocks, the first network security appliance may apply a hashing function to the respective hash block to generate a respective local hash value. In some such examples, receiving at least the portion of the non-local user list includes receiving one or more non-local hash values from the second network security appliance, and comparing the local user list with at least the portion of the non-local user list includes comparing the one or more local hash values with the one or more non-local hash values received from the second network security appliance. In some such examples, the one or more deviations comprise one or more deviant hash block values. In some such examples, merging the portion of the second user identifier records of the non-local user list corresponding with the one or more deviations with the first user identifier records of the local user list includes replacing, by the first network security device, a particular user identifier record of the first user identifier records corresponding with a deviant hash block value representing a discrepancy for the particular user identifier record between the first user identifier records and a corresponding user identifier record in the second user identifier records and adding, by the first network security device, one or more user identifier records to the first user identifier records that were previously not present in the first user identifier records.

In some examples, the first network security appliance may share, with at least the second network security appliance, the user identifier records corresponding with the one or more deviations identified by the first network security appliance.

In some examples, prior to receiving at least the portion of the non-local user list, the first network security appliance may determine that a virtual private network connection with a first end-user device is below a particular quality threshold and migrate the virtual private network connection to the second network security appliance.

In some examples, prior to receiving at least the portion of the non-local user list, the first network security appliance may receive an indication that a virtual private network connection for a first end-user device is being migrated from the second network security appliance to the first network security appliance.

Figure 8:
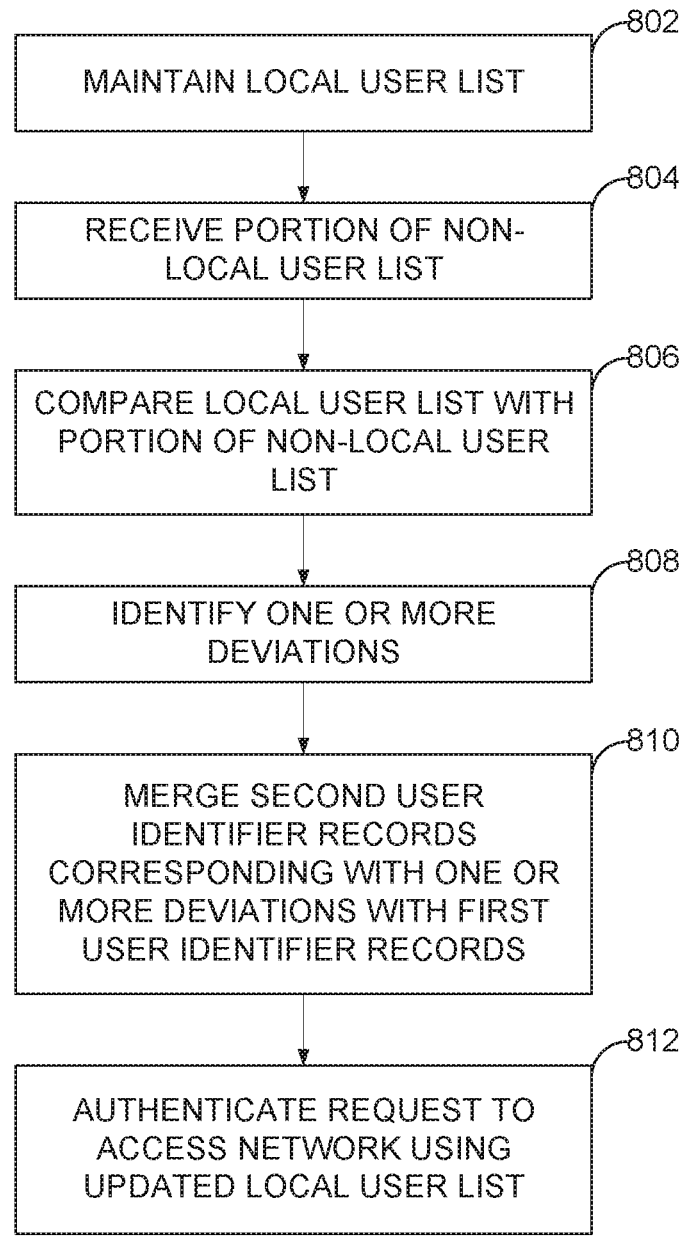
FIG. 8 depicts a process flowchart for maintaining and updating local user lists used to authenticate requests to access a network according to an aspect of the present disclosure.

FIG. 8 depicts a process flowchart for maintaining and updating local user lists used to authenticate requests to access a network according to an aspect of the present disclosure. The techniques described in FIG. 8 may be performed by a network security appliance, such as network access controller (NAC) 135 of FIG. 1. The following are steps of the process, although other examples of the process performed in accordance with the techniques of this disclosure may include additional steps or may not include some of the below-listed steps.

NAC 135 maintains a local user list comprising first user identifier records for accessing a network (802). The local user list has a predefined format. In some examples, in maintaining the local user list, NAC 135 may divide the local user list into one or more hash blocks, where each of the one or more hash blocks is configured according to a predefined hash block format to include a different respective portion of the user identifier records. For each of the one or more hash blocks, NAC 135 may apply a hashing function to the respective hash block to generate a respective local hash value.

NAC 135 receives at least a portion of a non-local user list that includes second user identifier records for a second network security appliance of the plurality of network security appliances (804). In the examples where the local user list is hashed, NAC 135 may receive one or more non-local hash values from the second network security appliance when receiving the portion of the non-local user list.

NAC 135 compares the local user list with at least the portion of the non-local user list received from the second network security appliance (806). In the examples where the lists are hashed, NAC 135 may compare the one or more local hash values with the one or more non-local hash values received from the second network security appliance. In comparing the local user list with the non-local user list, NAC 135 may identify one or more deviations (808). The one or more deviations may be one or more deviant hash block values.

In addition to identifying the one or more deviations, NAC 135 may also identify one or more non-relevant deviations between the local user list and the non-local user list, such as user information that was updated but then changed back to the original information or a user account that was added and then deleted, among other things. While this may cause a deviation in the hash list, NAC 135 may identify this deviation as non-relevant. As such, NAC 135 may refrain from merging the portion of the second user identifier records of the non-local user list corresponding with the one or more non-relevant deviations with the first user identifier records of the local user list.

NAC 135 merges the portion of the second user identifier records of the non-local user list corresponding with the one or more deviations with the first user identifier records of the local user list to generate an updated local user list (810). The updated local user list may include one or more of usernames of authentic users, passwords of authentic users, device information corresponding with the usernames of authentic users, usernames of blocked users, and device information corresponding with the usernames of blocked users. NAC 135 then authenticates a request to access the network using the updated local user list (812). In examples where the lists are hashed, NAC 135 may merge the portion of the second user identifier records of the non-local user list corresponding with the one or more deviations with the first user identifier records of the local user list by replacing a particular user identifier record of the first user identifier records corresponding with a deviant hash block value representing a discrepancy for the particular user identifier record between the first user identifier records and a corresponding user identifier record in the second user identifier records and add one or more user identifier records to the first user identifier records that were previously not present in the first user identifier records.

NAC 135 may also share, with at least the second network security appliance, the user identifier records corresponding with the one or more deviations identified by the first network security appliance. In some examples, NAC 135 may be a leader security appliance, with each other network security appliance in the plurality of network security appliances being a follower security appliance. In such examples, NAC 135 may request that each follower security appliance regenerate hash values based on the updated local user list.

In some examples, prior to receiving at least the portion of the non-local user list, NAC 135 may determine that a virtual private network connection with a first end-user device is below a particular quality threshold. NAC 135 may also migrate the virtual private network connection to the second network security appliance. In other examples, prior to receiving at least the portion of the non-local user list, NAC 135 may receive an indication that a virtual private network connection for a first end-user device is being migrated from the second network security appliance to the first network security appliance.

It will also be recognized by those skilled in the art that, while the techniques of this disclosure have been described above in terms of certain examples, it is not limited thereto. Various features and aspects of the above described techniques may be used individually or jointly. Further, although the techniques of this disclosure have been described in the context of their implementation in a particular environment, and for particular applications (e.g. merging end user authentication data across multiple network appliances), those skilled in the art will recognize that its usefulness is not limited thereto and that the techniques of this disclosure can be beneficially utilized in any number of environments and implementations where it is desirable to merge data files across devices by merging only selected portions of the data file.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A method, comprising:
   maintaining, by a first network security appliance of a plurality of network security appliances, a local user list comprising first user identifier records for accessing a network, wherein the local user list has a predefined format;
   dividing, by the first network security appliance, the local user list into a first set of hash blocks, wherein each of the first set of hash blocks is configured according to a predefined hash block format such that each hash block of the first set of hash blocks includes one portion of the first user identifier records;
   applying, by the first network security appliance, a hashing function to each hash block of the first set of hash blocks to generate a local set of hash values that includes a first hash value for each hash block of the first set of hash blocks;
   receiving, by the first network security appliance, a non-local set of hash values from a second network appliance of the plurality of network security appliances, wherein:
      the non-local set of hash values is generated through application of the hashing function to a second set of hash blocks, and
      the second set of hash blocks are configured according to the predefined hash block format in which each hash block of the second set of hash blocks includes one portion of a non-local list comprising second user identifier records for accessing a network that have the same predefined format;
   comparing, by the first network security appliance, the local set of hash values with at least the portion of the non-local set of hash values to identify a deviation, the deviation including a difference between a first hash value of the local set of hash values and a corresponding first hash value of the non-local set of hash values;
   generating, by the first network security appliance, an updated local user list, the generating including:

merging a portion of the first user identifier records that comprises content of the first hash value of the local set of hash values with a portion of the second user identifier records that comprises content of the first hash value of the non-local set of hash values, and replacing the portion of the first user identifier records and the portion of the second user identifier records with the merged contents; and authenticating, by the first network security appliance, a request to access the network using the updated local user list.

2. The method of claim 1, wherein merging further comprises adding, by the first network security appliance, a user identifier record of a first user identifier record that was previously not present in the first user identifier records.

3. The method of claim 1, further comprising:

sharing, by the first network security appliance, with at least a second network security appliance, the merged contents.

4. The method of claim 1, further comprising:

prior to receiving the non-local set of hash values:
  determining, by the first network security appliance, that a virtual private network connection with a first end-user device is below a particular quality threshold; and
  migrating, by the first network security appliance, the virtual private network connection to a second network security appliance.

5. The method of claim 1, further comprising:

prior to receiving at least the non-local set of hash values:
  receiving, by the first network security appliance, an indication that a virtual private network connection for a first end-user device is being migrated from a second network security appliance to the first network security appliance.

6. The method of claim 1, wherein:

the first network security appliance comprises a leader security appliance, each other network security appliance in the plurality of network security appliances comprises a follower security appliance, and the method further comprises requesting, by the first network security appliance, that each follower security appliance regenerate hash values based on the updated local user list.

7. The method of claim 1, wherein the updated local user list comprises one or more of usernames of authentic users, passwords of authentic users, device information corresponding with the usernames of authentic users, usernames of blocked users, and device information corresponding with the usernames of blocked users.

8. The method of claim 1, wherein the generating further includes:

identifying, by the first network security appliance, a non-relevant deviation between the local set of hash values and the non-local set of hash values; and refraining from merging, by the first network security appliance, portions of the first user identifier records and the second user identifier records that comprise content of the hash values corresponding with the non-relevant deviation.

9. A first network security appliance comprising: at least one processor; and a storage device configured to store one or more modules operable by the at least one processor to:

maintain a local user list comprising first user identifier records for accessing a network, wherein the local user list has a predefined format, wherein the network comprises a plurality of network security appliances that includes the first network security appliance;

divide the local user list into a first set of hash blocks, wherein each of the first set of hash blocks is configured according to a predefined hash block format such that each hash block of the first set of hash blocks includes one portion of the first user identifier records;

apply a hashing function to each hash block of the first set of hash blocks to generate a local set of hash values that includes a first hash value for each hash block of the first set of hash blocks;

receive a non-local set of hash values from a second network appliance of the plurality of network security appliances, wherein:
  the non-local set of hash values is generated through application of the hashing function to a second set of hash blocks, and
  the second set of hash blocks are configured according to the predefined hash block format in which each hash block of the second set of hash blocks includes one portion of a non-local list comprising second user identifier records for accessing a network that have the same predefined format;

compare the local set of hash values with at least the portion of the non-local set of hash values to identify a deviation, the deviation including a difference between a first hash value of the local set of hash values and a corresponding first hash value of the non-local set of hash values;

generate an updated local user list, the generating including:
  merging a portion of the first user identifier records that comprises content of the first hash value of the local set of hash values with a portion of the second user identifier records that comprises content of the first hash value of the non-local set of hash values, and
  replacing the portion of the first user identifier records and the portion of the second user identifier records with the merged contents; and authenticate a request to access the network using the updated local user list.

10. The first network security appliance of claim 9, wherein the one or more modules are further operable by the at least one processor to:

prior to receiving the non-local set of hash values:
  determine that a virtual private network connection with a first end-user device is below a particular quality threshold; and
  migrate the virtual private network connection to a second network security appliance.

11. The first network security appliance of claim 9, wherein the one or more modules are further operable by the at least one processor to:

prior to receiving the non-local set of hash values, receive an indication that a virtual private network connection for a first end-user device is being migrated from a second network security appliance to the first network security appliance.

12. The first network security appliance of claim 9, wherein:

the first network security appliance comprises a leader security appliance, each other network security appliance in the plurality of network security appliances comprises a follower security appliance, and the one or more modules are further operable by the at least one processor to request that each follower security appliance regenerate hash values based on the updated local user list.

13. A non-transitory computer readable storage medium storing instructions that, when executed by one or more processors of a first network security appliance, cause the one or more processors to:

maintain a local user list comprising first user identifier records for accessing a network, wherein the local user list has a predefined format, wherein the network comprises a plurality of network security appliances that includes the first network security appliance;

divide the local user list into a first set of hash blocks, wherein each of the first set of hash blocks is configured according to a predefined hash block format such that each hash block of the first set of hash blocks includes one portion of the first user identifier records;

apply a hashing function to each hash block of the first set of hash blocks to generate a local set of hash values that includes a first hash value for each hash block of the first set of hash blocks;

receive a non-local set of hash values from a second network appliance of the plurality of network security appliances, wherein:

the non-local set of hash values is generated through application of the hashing function to a second set of hash blocks, and the second set of hash blocks are configured according to the predefined hash block format in which each hash block of the second set of hash blocks includes one portion of a non-local list comprising second user identifier records for accessing a network that have the same predefined format;

compare the local set of hash values with at least the portion of the non-local set of hash values to identify a deviation, the deviation including a difference between a first hash value of the local set of hash values and a corresponding first hash value of the non-local set of hash values;

generate an updated local user list, the generating including:

merging a portion of the first user identifier records that comprises content of the first hash value of the local set of hash values with a portion of the second user identifier records that comprises content of the first hash value of the non-local set of hash values, and replacing the portion of the first user identifier records and the portion of the second user identifier records with the merged contents; and authenticate a request to access the network using the updated local user list.

14. The non-transitory computer readable storage medium of claim 13, wherein the instructions, when executed, further cause the one or more processors to:

prior to receiving at least the portion of the non-local set of hash values:

determine that a virtual private network connection with a first end-user device is below a particular quality threshold; and migrate the virtual private network connection to a second network security appliance.

15. The non-transitory computer readable storage medium of claim 13, wherein:

the first network security appliance comprises a leader security appliance, each other network security appliance in the plurality of network security appliances comprises a follower security appliance, and the instructions, when executed, further cause the one or more processors to request that each follower security appliance regenerate hash values based on the updated local user list.

16. The non-transitory computer readable storage medium of claim 13, wherein prior to receiving the non-local set of hash values, receive an indication that a virtual private network connection for a first end-user device is being migrated from a second network security appliance to the first network security appliance.

17. The non-transitory computer readable storage medium of claim 13, wherein the generating further includes:

identifying, by the first network security appliance, a non-relevant deviation between the local set of hash values and the non-local set of hash values; and refraining from merging, by the first network security appliance, portions of the first user identifier records and the second user identifier records that comprise content of the hash values corresponding with the non-relevant deviation.

18. The non-transitory computer readable storage medium of claim 13, wherein the updated local user list comprises one or more of usernames of authentic users, passwords of authentic users, device information corresponding with the usernames of authentic users, usernames of blocked users, and device information corresponding with the usernames of blocked users.

19. The non-transitory computer readable storage medium of claim 13, wherein merging further comprises adding, by the first network security appliance, a user identifier record of a first user identifier record that was previously not present in the first user identifier records.

* * * * *